US009606478B2

(12) United States Patent
Tsuji

(10) Patent No.: US 9,606,478 B2
(45) Date of Patent: Mar. 28, 2017

(54) ELECTROPHOTOGRAPHIC MEMBER, INTERMEDIATE TRANSFER MEMBER AND ELECTROPHOTOGRAPHIC IMAGE FORMING APPARATUS

(71) Applicant: CANON KABUSHIKI KAISHA, Tokyo (JP)

(72) Inventor: Yasutomo Tsuji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 331 days.

(21) Appl. No.: 14/295,166

(22) Filed: Jun. 3, 2014

(65) Prior Publication Data

US 2014/0370296 A1 Dec. 18, 2014

(30) Foreign Application Priority Data

Jun. 12, 2013 (JP) ................................ 2013-124190

(51) Int. Cl.

| | |
|---|---|
| ***B32B 9/04*** | (2006.01) |
| ***G03G 15/01*** | (2006.01) |
| ***G03G 15/16*** | (2006.01) |
| ***G03G 5/00*** | (2006.01) |
| ***G03G 5/147*** | (2006.01) |

(52) U.S. Cl.

CPC ............ *G03G 15/162* (2013.01); *G03G 5/00* (2013.01); *G03G 5/1476* (2013.01); *G03G 5/14773* (2013.01); *G03G 5/14791* (2013.01); *G03G 5/14795* (2013.01); *G03G 2215/0129* (2013.01); *Y10T 428/31504* (2015.04)

(58) Field of Classification Search

USPC .............................. 428/32.81, 446; 399/302
See application file for complete search history.

(56) References Cited

U.S. PATENT DOCUMENTS

| | | | | |
|---|---|---|---|---|
| 5,106,816 A * | 4/1992 | Morohoshi | ............ B41M 5/529 | 347/221 |
| 7,704,922 B2 * | 4/2010 | Suzuki | .................. B41M 5/529 | 428/32.39 |
| 2010/0243141 A1 * | 9/2010 | Muro | .................... B41M 5/426 | 156/234 |
| 2010/0248128 A1 | 9/2010 | Mitsuzawa et al. | | |
| 2010/0256313 A1 * | 10/2010 | Nakamura | ............. C08L 63/00 | 525/476 |
| 2014/0162068 A1 | 6/2014 | Yoshida et al. | | |

FOREIGN PATENT DOCUMENTS

| | | |
|---|---|---|
| JP | 2008-129481 A | 6/2008 |
| JP | 2010-224300 A | 10/2010 |
| WO | 2012/176617 A1 | 12/2012 |

OTHER PUBLICATIONS

Chinese Office Action dated Feb. 1, 2016 in Chinese Application No. 201410258540.X.

* cited by examiner

*Primary Examiner* — Tae H Yoon
(74) *Attorney, Agent, or Firm* — Fitzpatrick, Cella, Harper & Scinto

(57) ABSTRACT

An electrophotographic member which has resistance to discharge degradation and can maintain the toner releasability for a long period is provided. The electrophotographic member includes a substrate and a surface layer. The surface layer includes a binder resin having an acrylic skeleton and a modified silicone compound having a polyether group and a hydroxyl group in a molecule, the surface layer having a surface having a n-hexadecane contact angle of 30° or more.

7 Claims, 2 Drawing Sheets

ELECTROPHOTOGRAPHIC MEMBER, INTERMEDIATE TRANSFER MEMBER AND ELECTROPHOTOGRAPHIC IMAGE FORMING APPARATUS

BACKGROUND OF THE INVENTION

Field of the Invention

The present invention relates to a electrophotographic member, an intermediate transfer member for use in an electrophotographic color image forming apparatus such as an electrophotographic photocopying machine and printer, and an electrophotographic image forming apparatus.

Description of the Related Art

A certain full-color electrographic image forming apparatus employs an intermediate transfer method, in which four color toners (yellow, magenta, cyan and black) are sequentially superimposed on a electrophotographic member such as an intermediate transfer member and then transferred to a medium to be recorded such as paper in a lump. In order to achieve high quality image by the intermediate transfer method, it is important to improve the transfer of a toner image to a medium to be recorded with enhanced toner releasability on the surface of an intermediate transfer member.

Japanese Patent Application Laid-Open No. 2008-129481 discloses an invention of an image forming semiconducting member which has effects of reducing attachment of paper powder and toner to the surface of the outermost layer, suppressing bleeding from the interior of the outermost layer, preventing contamination of a photo conductor, and the like. According to the description of Japanese Patent Application Laid-Open No. 2008-129481, it is preferable to add a silicone compound having a reactive group to the outermost layer, the reactive group being capable of more rigidly fixing the releasable component to the coating.

In recent years, in transferring the toner image on an intermediate transfer member to a medium to be recorded (hereinafter also referred to as "secondary transfer"), the applied voltage (hereinafter also referred to as "secondary transfer voltage") tends to be increased in order to meet the demand for speeding up the electrophotographic printing rate and to further improve the transfer efficiency of toner. The present inventors have found that the increased secondary transfer voltage causes a discharge phenomenon between the surface of an intermediate transfer member and a transfer roller, which gradually decomposes silicone compounds in the surface layer. In other words, it was found that the releasability of the surface of an intermediate transfer member may be chronologically changed due to the decomposition of the silicone compounds in the surface layer. Hereinafter the degradation mode of a electrophotographic member due to discharge is described as "discharge degradation".

With reference to Japanese Patent Application Laid-Open No. 2008-129481, the present inventors investigated an intermediate transfer member including silicone compound chemically fixed to the binder resin in a surface layer. Consequently, it was found that an effect for suppressing a bleeding of the silicone compounds. However, when the silicone compounds existing in the surface of a surface layer or in the vicinity of the surface are decomposed by discharge degradation, the toner releasability of the surface of a surface layer is reduced. Furthermore, the silicone compound fixed to a binder resin with a covalent bonding, existing inside the surface layer is hardly moved to the surface. Consequently the reduced toner releasability at the surface hardly be recovered. It is therefore required to develop technology for recovering the toner releasability at the surface in order to make an intermediate transfer member for use for a longer period.

SUMMARY OF THE INVENTION

The present invention is directed to providing a electrophotographic member suitable for use as an intermediate transfer member which can sufficiently achieve both of suppressing bleeding of silicone compounds and maintaining the toner releasability for a long period, and to provide an intermediate transfer member.

Further, the present invention is directed to providing an electrophotographic image forming apparatus capable of stably forming high-quality electrophotographic images.

According to one aspect of the present invention, there is provided a electrophotographic member having a substrate and a surface layer, wherein the surface layer comprises a binder resin having an acrylic skeleton and a modified silicone compound having a polyether group and a hydroxyl group in a molecule, and wherein the surface layer has a surface having a n-hexadecane contact angle of 30° or more.

According to another aspect of the present invention, there is provided an intermediate transfer member for use in an electrophotographic image forming apparatus which obtains an image by primary-transferring a toner image formed on a first image bearing member to an intermediate transfer member and then secondary-transferring the primary-transferred toner image on the intermediate transfer member onto a second image bearing member, the intermediate transfer member being the aforementioned electrophotographic member.

According to further aspect of the present invention, there is provided an electrophotographic image forming apparatus which obtains an image by primary-transferring a toner image formed on a first image bearing member to an intermediate transfer member and then secondary-transferring the primary-transferred toner image on the intermediate transfer member onto a second image bearing member, the intermediate transfer member being the aforementioned electrophotographic member.

Further features of the present invention will become apparent from the following description of exemplary embodiments with reference to the attached drawings.

DESCRIPTION OF THE EMBODIMENTS

Figure 1:
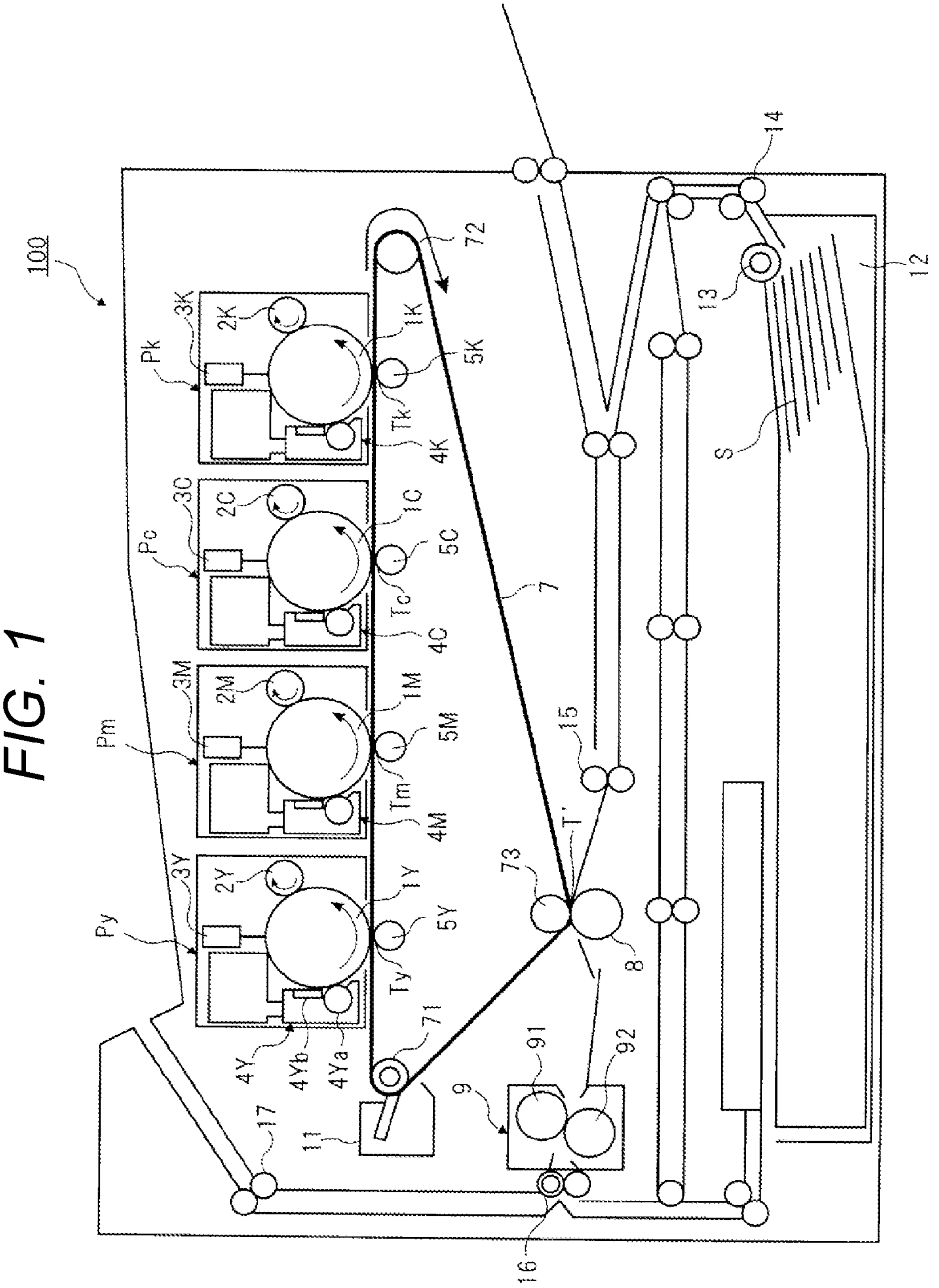
FIG. 1 is a diagram illustrating an electrophotographic image forming apparatus of the present invention.

Preferred embodiments of the present invention will now be described in detail in accordance with the accompanying drawings.

The electrophotographic member of the present invention includes a surface layer including a binder resin having an acrylic skeleton and a modified silicone compound having a polyether group and a hydroxyl group in a molecule, the surface layer having a surface having a n-hexadecane contact angle of 30° or more.

A electrophotographic member having such a configuration can suppress an excess bleeding of silicone compounds.

Furthermore, the reduction in toner releasability due to discharge degradation is small even under exposure to discharge for a long period in a long term use for forming electrophotographic images. Consequently high-quality electrophotographic images can be stably formed for a long period.

The present inventors presume that the electrophotographic member of the present invention has the effects due to the following reasons.

The modified silicone compound for use in the present invention has a polyether group and a hydroxyl group in a molecule. The polyether group in the modified silicone compound allows the compatibility of the modified silicone compound with a resin having an acrylic skeleton (hereinafter also referred to as "acrylic resin") to be improved.

On the other hand, the hydroxyl group in the modified silicone compound is basically not reactive with an acrylic resin having no isocyanate group. The hydrogen of a hydroxyl group with high acidity in the modified silicone compound, however, forms a hydrogen bond with the carbonyl oxygen in an acrylic resin. As a result, the modified silicone compound contained in the surface layer which contains an acrylic resin as matrix resin is suppressed from bleeding to the surface of the surface layer.

The presence or absence of bleeding of the modified silicone compound can be easily checked by chronological comparison of the silicon atom % at the surface of a surface layer by elemental analysis.

It is believed that the toner releasability under environment with discharge occurring is recovered by supply of the modified silicone compounds retained at the interior of the surface layer to the surface, even when the modified silicone compounds localized in the vicinity of the surface are decomposed by discharge degradation.

As described above, it is known that compounds having small surface energy such as silicone compounds are localized at the surface of a surface layer. The reason is believed that the aggregate at the interface with air where the energy is most unstabilized allows the energy of a system to be minimized. The surface energy at the outermost surface therefore increases when the silicone compounds localized at the surface are deactivated by discharge, so that the silicone compounds are supplied from the interior of the surface layer for returning to the most stabilized state, resulting in maintaining the toner releasability.

On the other hand, reactive silicone compounds fixed to binder resin by covalent bonding have no such a self-repairing function, resulting in difficulty in maintaining the toner releasability against discharge degradation.

Based on the above, the effects of the present invention may be derived as follows. A modified silicone compound has a polyether group and a hydroxyl group in a molecule, so that the polyether group improves the compatibility with binder resin, enhancing the retainability of the modified silicone compound to the interior of the surface layer. The hydroxyl group forms a hydrogen bond with a carbonyl group in the binder resin, so that the modified silicone compound is fixed to the interior of the surface layer so as to suppress bleeding, preventing a contact member from being contaminated. It is presumed that only when the surface energy of a surface layer increases due to discharge degradation or the like, the modified silicone compounds move to the surface from the interior of the surface layer by the driving force for re-stabilizing the surface energy, resulting in maintaining constant toner releasability at any time.

The preferred embodiment of the present invention is described in the following.

Figure 2:
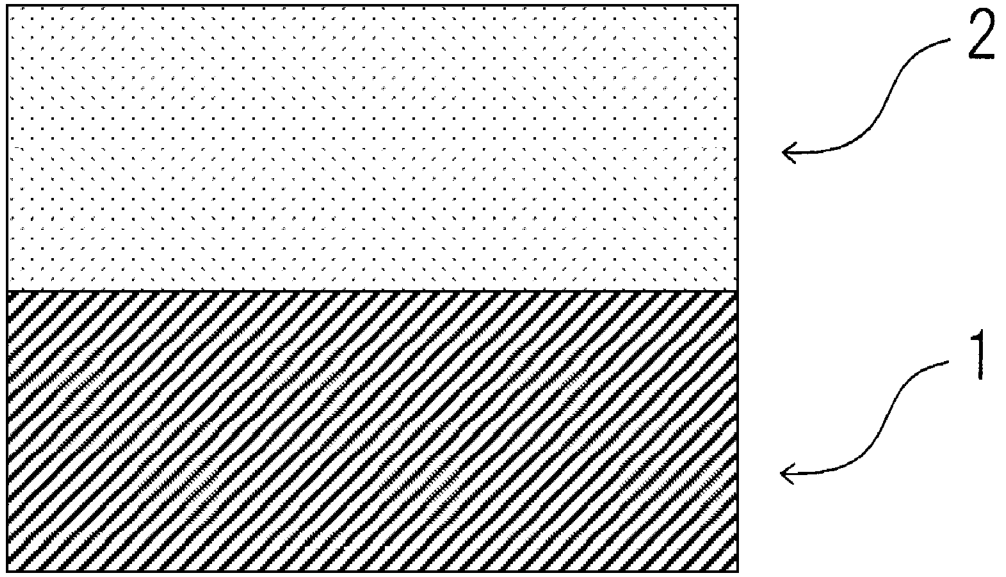
FIG. 2 is a schematic cross-sectional view of a electrophotographic member in one embodiment of the present invention.

A schematic cross-sectional view of a electrophotographic member in one embodiment of the present invention is illustrated in FIG. 2. Reference numeral 1 denotes the substrate of a electrophotographic member of the present invention. Reference numeral 2 denotes the surface layer laminated on the substrate. In general, the substrate has a thickness of 10 μm or more and 500 μm or less, in particular, 30 μm or more and 150 μm or less. The thickness of a surface layer can be 1 μm or more in view of the abrasion and wear under endurance conditions for an actual machine, and can be 20 μm or less in view of the flex resistance.

After formation of the surface layer on the substrate, the electric resistance of a electrophotographic member can generally have a volume resistivity of $1.0\times10^{8}$ Ω·cm or more and $1.0\times10^{14}$ Ω·cm or less. The surface resistivity measured from the surface layer side can be $1.0\times10^{7}$ Ω/square or more and $1.0\times10^{13}$ Ω/square or less. The electric resistance of a electrophotographic member set within the semiconducting region allows for more stable transfer (primary transfer) and secondary transfer of a toner image from an electrophotographic photo conductor, in the case of using the electrophotographic member as intermediate transfer member. Alternatively, another layer may exist between the substrate and the surface layer.

(Substrate)

First, the substrate of the electrophotographic member of the present invention is described in the following. Examples of the typical form of the substrate include a semiconductive film or cylindrical seamless belt of resin in which a conductive agent is contained, and a semiconductive roller having a metal shaft as a cored bar. The resin for use may be any one of a thermosetting resin and a thermoplastic resin. Examples of the thermoplastic resin include polycarbonate, polyvinylidene fluoride (PVdF), polyethylene, polypropylene, polymethylpentene-1, polystyrene, polyamide, polylactic acid (PLLA), polysulfone, polyarylate, polyethylene terephthalate, polybutylene terephthalate, polyethylene naphthalate, polybutylene naphthalate, polyphenylene sulfide, polyether sulfone, polyether nitrile, thermoplastic polyimide, polyether ether ketone, a thermotropic liquid crystal polymer and polyamide acid. Examples of the thermosetting resin include thermosetting polyimide, a phenol resin, a polyester resin, an amino resin, an epoxy resin, a melamine resin, a thermosetting polyurethane resin, a thermosetting acrylic resin and a fluorine-modified resin. These may be used alone or as a blended or alloyed mixture.

As the conductive agent, an electron conductive material and an ion conductive material can be used. As the electron conductive material, carbon black, antimony doped tin oxide, titanium oxide, a conductive polymer such as polyaniline, and the like can be used. As the ion conductive material, sodium perchlorate, lithium, an ionic surfactant such as a cationic or anionic surfactant, a nonionic surfactant, an oligomer or polymer compound having oxyalkylene repeating units, and the like can be used. An antioxidant, a UV absorber, a pH conditioner, a cross-linker, a pigment and the like may be added to the substrate on an as needed basis.

A method for manufacturing a substrate which contains a thermosetting resin such as polyimide may include dispersing carbon black as a conductive agent in a polyimide precursor or soluble polyimide and a solvent, and forming into a seamless belt by coating with a centrifugal casting apparatus and by subsequent baking. In the case of a electrophotographic member in an endless belt shape, the thickness of the substrate can be 30 μm or more and 150 μm or less. Alternatively, in the case of using a thermoplastic resin as the resin, carbon black as a conductive agent and the resin, and an additive on an as needed basis, are mixed and melt kneaded with a biaxial kneader or the like so as to make semiconductive pellets. Subsequently the pellets are melt extruded to produce a semiconductive film in a sheet, film or seamless belt shape. Alternatively, forming may be performed by thermal pressing or injection molding. Alternatively, the semiconductive film may be obtained from a molded preform by stretch blow molding. The manufacturing method of a transfer belt as a electrophotographic member of the present invention is not specifically limited, including any other manufacturing method.

(Surface Layer)

Subsequently, a surface layer is described in the following. The surface layer contains a binder resin having an acrylic skeleton and a modified silicone compound. The modified silicone compound includes a polyether group and a hydroxyl group in a molecule. The surface of the surface layer has a n-hexadecane contact angle of 30° or more. The surface layer can suppress bleeding of silicone compounds from the surface layer and suppress reduction in toner releasability due to discharge degradation occurring in electrophotographic processes.

(Binder Resin)

Examples of the binder resin having an acrylic skeleton include a polyacrylate ester resin and a polymethacrylate ester resin. The binder resin may be a random copolymer, a graft copolymer or a block copolymer as a mixture of a plurality kinds of resins.

Examples of the raw material (monomer) for the binder resin include the following: dipentaerythritol hexaacrylate, dipentaerythritol pentaacrylate, dipentaerythritol polyacrylate, pentaerythritol tetraacrylate, trimethylolpropane trimethacrylate, isoamyl acrylate, lauryl acrylate, stearyl acrylate, ethoxy diethylene glycol acrylate, phenoxy ethylacrylate, phenoxy diethylene glycol acrylate, tetrahydrofurfuryl acrylate and isobornyl acrylate.

The binder resin can have a structural unit represented by the following chemical formula (1).

Formula 1

(1)

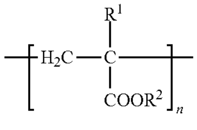

In the formula (1), $R^1$ represents a hydrogen atom or a methyl group, $R^2$ represents a hydrogen atom or an alkyl, and n represents an integer of 2 or more.

(Modified Silicone Compound)

A modified silicone compound is modified with a polyether group for enhancing the compatibility with a binder resin and enhancing the retainability to the interior of the surface layer. The amount of polyether modification in the modified silicone compound can be 20 mass % to 40 mass % polyether group relative to 100 mass % polysiloxane which is the main skeleton of silicone. The amount of polyether modification of a modified silicone compound set within the range allows for improved compatibility with an acrylic resin. In addition, since the proportion of polysiloxane contributing to toner releasability in a molecule of the modified silicone compound can be sufficiently increased, the toner releasability at the surface of the electrophotographic member of the present invention can be further improved.

Furthermore, since a modified silicone compound has a hydroxyl group other than a polyether group in a molecule, a definite toner releasability can be achieved due to self repair even when the toner releasability of the surface layer is reduced by discharge degradation. It is known that since a nonreactive polyether modified silicone compound having no hydroxyl group cannot react with a binder resin, bleeding to the surface of a electrophotographic member is caused due to the high molecular mobility in the binder resin, resulting in contamination to a contact member.

A reactive silicone compound which can react with a binder resin is used as a unit for suppressing the occurrence of bleeding, improving the abrasion resistance as well. According to a further image output test by the present inventors, however, it was found that the toner releasability is reduced due to degradation of the surface layer caused by discharge occurring in electrophotographic processes. The finding is presumed from the experimental fact that the releasability is not practically reduced for idle rotation without energization.

According to measurement of the chemical composition of the surface of the surface layer of a electrophotographic member having reduced toner releasability by X-ray photoelectron spectroscopy (ESCA), silicon atoms in silicone compounds predominantly contributing to releasability exist in an amount of 10 atom % to 30 atom % before an endurance test. It was, however, confirmed that the silicon atoms exist in an amount of several atom % or less after an endurance test for feeding 1,000 sheets or more of paper. Based on the results, the present inventors presume that the occurrence of any degradation due to discharge causes cutting of the silicone skeletons which exist at the surface of a electrophotographic member and contribute to the releasability, so that the characteristics of the silicone skeleton are lost, resulting in reduction of the toner releasability.

Also from an experiment by the present inventors, it was found that in the case of using a reactive silicone compound, the toner releasability cannot be maintained, once the silicone compound at the surface of the surface layer is decomposed by discharge.

The present inventors, however, found that inclusion of a hydroxyl group nonreactive to an acrylic resin in a polyether-containing modified silicone compound can suppress a contact member from being contaminated by bleeding and maintain the toner releasability for a long period even under high humidity conditions liable to cause discharge. The mechanism is presumed as follows.

With a noncovalent bonding interaction such as hydrogen bond between a binder resin and a modified silicone compound, the modified silicone compound can be retained to the interior of the surface layer, and thus bleeding of the modified silicone compound can be suppressed. Furthermore, when the surface energy of the surface layer increases, the modified silicone compound moves to the surface from the interior of the surface layer. The occurrence of the phenomenon allows the toner releasability of the surface once reduced by discharge degradation to be recovered, maintaining the excellent toner releasability for a long period. That is, the recovery of the toner releasability of the present invention is attributable to the retention of the silicone compound to the interior of the surface layer with hydrogen bonding, i.e. an interaction between molecules, which is different from the case of using a reactive silicone compound to be directly incorporated in the surface layer by covalent bonding.

The toner releasability at the surface of the electrophotographic member of the present invention can be evaluated by the contact angle of n-hexadecane, i.e. an oily liquid, at the surface of the surface layer. The higher the contact angle is, the higher the toner releasability is. High releasability can be achieved for a contact angle of approximately 30° or more, though depending on the type of toner.

The modified silicone compound can have a structure represented by the following chemical formula (2). The binder resin having an acrylic skeleton can have a structure represented by the chemical formula (1), and the modified silicone compound can have a structure represented by the following chemical formula (2) in parallel.

Formula 2

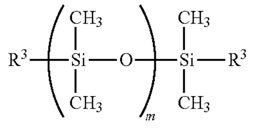

(2)

In the formula (2), m represents an integer of 2 or more, and $R^3$ has a structure represented by the following chemical formula (3).

Formula 3

$$-(C_pH_{(2p)}O)_a-(C_qH_{(2q)}O)_b-H \quad (3)$$

In the formula (3), p and q each independently represent an integer of 2 or more, and a and b each represent an integer of 1 or more.

The modified silicone compound can have a weight average molecular weight (Mw) in the range of 6,000 or more and 12,000 or less. It is known that the self-repairing rate of a modified silicone compound depends on the weight average molecular weight of the modified silicone. This is presumed that the smaller the weight average molecular weight of a silicone compound is, the more easily the movement is achieved from the interior of the surface layer to the surface. In other words, a modified silicone compound having a weight average molecular weight Mw of 12,000 or less relatively easily moves from the interior of the surface layer to the surface. As a result, it was confirmed that the self-repairing rate of the toner releasability at the surface of a electrophotographic member used for a long period is liable to be faster compared to the case of an Mw of more than 12,000. Accordingly, in order to recover the reduction in the toner releasability due to discharge degradation in a short time, a modified silicone compound having a weight average molecular weight Mw of 12,000 or less can be used. Meanwhile, in order to impart sufficient toner releasability to the surface layer, the modified silicone compound having a weight average molecular weight Mw of 6,000 or more can be used.

In the present invention, the weight average molecular weight is measured by gel permeation chromatography (GPC) for measuring molecular weight distribution under the following conditions. A column is stabilized in a heat chamber at a temperature of 40° C. Toluene as solvent is passed through the column at the temperature at a flow rate of 1 mL/min. About 100 μL of toluene sample solution of nonreactive silicone compound with a prepared sample concentration of 0.3 mass % is injected for measurement. In the molecular weight measurement of the sample, the molecular weight distribution of the sample is calculated from the relations between the logarithmic value of a calibration curve prepared from several kinds of monodisperse polystyrene standard samples and the retention time. As the standard polystyrene samples for preparing the calibration curve, products commercialized by Tosoh Corporation and Pressure Chemical Co. are available. A refractive index detector is used as a detector. A plurality of commercialized polystyrene gel columns can be combined as a column for use.

The hydroxyl value (mg KOH/g) of a modified silicone compound can be 30 or more and 70 or less. The hydroxyl value of a modified silicone compound set within the range allows the compound to be more reliably retained to an acrylic resin by hydrogen bonding.

Here, the hydroxyl value represents as the number of milligrams of potassium hydroxide required to acetylize the hydroxyl groups contained in one gram of a sample. The hydroxyl value can be measured by acetylizing hydroxyl groups in the modified silicone compound with acetic anhydride and titrating the acetic acid not used in acetylization with potassium hydroxide solution.

The content of the modified silicone compound in the surface layer can be 5 mass % or more and 60 mass % or less relative to the resin components in the surface layer. The 5 mass % or more addition allows a sufficient amount of modified silicone compounds to be retained to the interior of the surface layer for recovering the toner releasability in the case of discharge degradation of the surface layer, though depending on the conditions of discharge degraded silicone at the surface.

The surface layer can have an average hardness in the range of 0.20 GPa or more and 0.30 GPa or less in the depth region of 10% or more and 20% or less of the thickness from the outermost surface by nano-indentation method with a Berkovich indenter. The hardness of the surface layer can be measured by a nano-indenter G200 made by Agilent Technologies, Inc., using a Berkovich indenter.

An average hardness in the measurement depth region of 10% or more and 20% or less of the thickness from the outermost surface of the surface layer is calculated. A depth region of less than 10% of the film thickness of the surface layer, i.e. the vicinity of the outermost surface, is liable to be affected by the measurement environment such as vibration of an indenter. A depth region of more than 20% of the film thickness of the surface layer is liable to be affected by a substrate. Accordingly, these regions are excluded from the calculation.

The average hardness of a surface layer set within the range can suppress abrasion and the like due to sliding over a sliding member (e.g. cleaning blade), and surface friction with toner or the like interposing between a sliding member and the surface layer. Furthermore, excellent toner releasability can be consistently imparted due to sufficiently high molecular mobility inside the surface layer of the modified silicone compound, with little effect on the recovery rate of toner releasability.

The molecular structure of a modified silicone compound including a polyether group and a hydroxyl group in a molecule and the structures of a silicone portion and a polyether portion can be identified by isolating the modified silicone compound from the surface layer and using a method such as thermal decomposition GC/MS, NMR, IR and elemental analysis. The content of the modified silicone compound in a surface layer may be determined from a quantitative ratio in extraction from the surface layer. The solvent for extraction needs to be selected from solvents nonreactive to the modified silicone compound. For example, solvent such as tetrahydrofuran (THF), ethyl acetate and methyl ethyl ketone (MEK) can be suitably used. Examples of the subsequent isolated purification method include removing the solvent by a rotary evaporator or the like and isolating by various kinds of chromatography.

(Manufacturing Method of Electrophotographic Member)

A specific method for manufacturing a electrophotographic member of the present invention is described in the following by taking example of an intermediate transfer member in a belt-like shape.

A modified silicone compound having a polyether group and a hydroxyl group, an additive, a polymerization initiator and a solvent are mixed into a binder resin raw material (monomer), and sufficiently agitated to produce a mixed dispersion liquid. As the polymerization initiator, a photopolymerization initiator IRGACURE (Ciba-Geigy K.K.) or the like may be suitably used. As the additive, a conductive agent, filler particles, a colorant, a leveling agent or the like may be used. The produced mixed dispersion liquid is applied to a substrate in a belt-like shape by a coating unit such as ring coating, dip coating, spray coating, roll coating and spin coating. The coating film is then dried at a temperature of 60° C. to 90° C. for distillation of solvent. Subsequently the coating film is cured with a device for exposure to active energy rays such as UV rays and electron beams, so as to form a surface layer. An intermediate transfer member in a belt-like shape of the present invention can be thus obtained.

Any desired film thickness of a surface layer may be obtained by adjusting film forming conditions such as solid content concentration of a mixed dispersion liquid and film forming rate. The film thickness of a surface layer can be 1 μm or more in view of the abrasion and wear under endurance conditions for a real machine, and 10 μm or less in view of the flex resistance of a stretched belt. The film thickness of a surface layer can be 5 μm or less when further flex resistance is required.

The thus formed intermediate transfer member for electrophotography has excellent toner releasability, suppresses bleeding of a modified silicone compound in use for a long period, and maintains excellent toner releasability in a paper feed endurance test under conditions with occurrence of discharge.

(Intermediate Transfer Member)

The electrophotographic member of the present invention can be used as intermediate transfer member for use in an electrophotographic image forming apparatus which obtains an image by primary-transferring a toner image formed on a first image bearing member to an intermediate transfer member and then secondary-transferring the toner image primary-transferred on the intermediate transfer member to a second image bearing member.

(Electrophotographic Apparatus)

The electrophotographic image forming apparatus 100 in FIG. 1 is an electrophotographic color image forming apparatus (color laser printer). The electrophotographic image forming apparatus includes image forming units Py, Pm, Pc and Pk for respective colors yellow (Y), magenta (M), cyan (C) and black (K) sequentially disposed in the movement direction along the flat part of an intermediate transfer belt 7, i.e. an intermediate transfer member. In FIG. 1, 1Y, 1M, 1C and 1K each represent an electrophotographic photo conductor; 2Y, 2M, 2C and 2K each represent a charging roller; 3Y, 3M, 3C and 3K each represent a laser exposure apparatus; 4Y, 4M, 4C and 4K each represent a developing machine; and 5Y, 5M, 5C and 5K each represent a primary transfer roller. Since each image forming unit has a same fundamental structure, the details of an image forming unit are described only for the yellow image forming unit Py.

The yellow image forming unit Py includes a drum-type electrophotographic photo conductor 1Y as image bearing member (hereinafter also referred to as "photoconductive drum" or "first image bearing member"). The photoconductive drum 1Y includes a substrate of aluminum cylinder, on which a charge generating layer, a charge transporting layer and a surface protective layer are sequentially laminated.

The yellow image forming unit Py further includes a charging roller 2Y as a charging unit. A charging bias is applied to the charging roller 2Y, so that the surface of the photoconductive drum 1Y is uniformly charged.

Above the photoconductive drum 1Y, a laser exposure apparatus 3Y as image exposure unit is disposed. The laser exposure apparatus 3Y forms the electrostatic latent image of yellow component on the surface of the photoconductive drum 1Y by scanning exposure of the uniformly charged surface of the photoconductive drum 1Y in response to the image information.

The electrostatic latent image formed on the photoconductive drum 1Y is developed with the toner as developing agent by a developing machine 4Y as developing unit. In other words, the developing machine 4Y includes: a developing roller 4Ya, i.e. a developing agent bearing member and a regulating blade 4Yb, i.e. a member for regulating the amount of a developing agent; and accommodates yellow toner, i.e. a developing agent. The developing roller 4Ya supplied with yellow toner is lightly pressure-contacted with the photoconductive drum 1Y in a developing part, being rotated in the forward direction with the photoconductive drum 1Y at a different speed. The yellow toner transported to a developing part by the developing roller 4Ya is attached to an electrostatic latent image formed on the photoconductive drum 1Y by application of a developing bias to the developing roller 4Ya. A visible image (yellow toner image) is thus formed on the photoconductive drum 1Y.

An intermediate transfer belt 7 stretched over a driving roller 71, a tension roller 72 and a driven roller 73 comes in contact with the photoconductive drum 1Y so as to be moved (rotation driven) in the arrow direction in the drawing.

The yellow toner image formed on the photoconductive drum (on a first image bearing member) arriving at a primary transfer part Ty is primary-transferred onto the intermediate transfer belt 7 by a primary transfer member (primary transfer roller 5Y) disposed opposite to the photoconductive drum 1Y through the intermediate transfer belt 7.

In a similar way, the image forming operation is performed for each of the units Pm, Pc and Pk for magenta (M), cyan (C) and black (K), respectively, with the movement of the intermediate transfer belt 7, so that the toner images of four colors, i.e. yellow, magenta, cyan and black, are laminated on the intermediate transfer belt 7. The toner layers of four colors are transported with the movement of the intermediate transfer belt 7, and transferred in a lump onto a transfer material S (hereinafter also referred to as "second image bearing member") transported at a predetermined timing by a secondary transfer roller 8 as secondary transfer unit in a secondary transfer part T'. In such a secondary transfer, several kv of transfer voltage is usually applied for securing a sufficient transfer ratio, causing occurrence of discharge in the vicinity of transfer nip in some cases. The discharge is one cause of the chemical deterioration of the transfer member.

A transfer material S is supplied to a transportation passage from a cassette 12 where the transfer material S is accommodated by a pick-up roller 13. The transfer material S supplied to the transportation passage is transported to the secondary transfer part T' in synchronization with the toner images of four colors transferred to the intermediate transfer belt 7 by a pair of transportation rollers 14 and a pair of resist rollers 15.

The toner image transferred to the transfer material S is fixed by a fixing unit 9, making a full-color image, for example. The fixing unit 9 includes a fixing roller 91 having a heating unit and a pressure roller 92, so that an unfixed toner image on the transfer material S is heated and compressed for fixation. Subsequently the transfer material S is discharged outside the machine by a pair of transportation rollers 16 and a pair of discharge rollers 17.

A cleaning blade 11, i.e. a cleaning unit of the intermediate transfer belt 7, disposed downstream the secondary transfer part T' in the driving direction of the intermediate transfer belt 7 removes residual toner after transfer which remains on the intermediate transfer belt 7 without being transferred to the transfer material S in the secondary transfer part T'.

As described above, the electric transfer processes of the toner image from the photo conductor to the intermediate transfer belt, and the intermediate transfer belt to the transfer material are repeated. Recordings to many transfer materials are repeated, so that the electric transfer processes are further repeated.

Use of the electrophotographic member of the present invention as the intermediate transfer belt in the electrophotographic image forming apparatus suppresses the chronological change in the efficiency of transfer (secondary transfer) of the toner image from the intermediate transfer belt to a transfer material such as paper. Consequently high-quality electrophotographic images can be formed for a long period.

The present invention can provide a electrophotographic member suitable for use in an intermediate transfer member which can sufficiently achieve both of suppressing bleeding of silicone compounds and maintaining the toner releasability for a long period. The present invention can also provide an electrophotographic image forming apparatus capable of stably forming high-quality electrophotographic images.

EXAMPLES

The present invention is described with reference to Examples and Comparative Examples in the following. In the Examples and Comparative examples, the raw materials of a mixed dispersion liquid are diluted or dispersed with solvent in some cases. When not specifically indicated, the used amount (mass %) of each of the raw materials means the nonvolatile content, excluding the amount of solvent (volatile content). Preceding the Examples, the evaluation methods of an intermediate transfer member are described in the following.

(1. Measurement of Film Thickness of the Substrate and the Surface Layer of an Intermediate Transfer Member)

A substrate was cut into a size of about 50 mm in length and about 50 mm in width, and measured for 9 points with a micrometer MDC-MJ/PJ made by Mitutoyo so as to obtain an average.

For measurement of the film thickness of the surface layer laminated on a substrate, a cross section perpendicular to the surface was made with a cross section polisher (SM-09010, made by JEOL Ltd.). Subsequently the cross section was observed at arbitrary 9 points with a scanning-type electron microscope (trade name: XL-300-SFEG, made by FEI), so as to obtain an image data. The film thickness of the surface layer was calculated from the image data. The average of the calculated film thickness was assumed as the film thickness of the surface layer.

(2. Evaluation of Toner Releasability)

The toner releasability of a electrophotographic member of the present invention which includes a modified silicone was evaluated by measuring the oil repellency of the surface layer. The effect of a wax component attached to the surface of toner particles is presumed to be a factor for reducing the toner releasability. Accordingly, it is liable that the higher the oil repellency of the surface is, the more excellent toner releasability can be, while the higher the lipophilicity of the surface is, the worse the toner releasability can be. It is common to measure the contact angle of oily liquid n-hexadecane as probe liquid on the surface of the surface layer for evaluating the oil repellency. The contact angle was measured by a contact angle meter (DROPMASTER 500 made by Kyowa Interface Science Co., Ltd). The liquid amount of n-hexadecane to be dropped was 1 μL, and the measurement time was 5 seconds.

(3. Measurement of the Hardness of Surface Layer)

The hardness of a surface layer was measured by a nano-indenter G200 made by Agilent Technologies, Inc., using a Berkovich indenter. The average hardness in the measurement depth region of 10% to 20% of the thickness from the outermost surface of the surface layer was calculated.

(4. Measurement of the Surface Roughness)

The evaluation was based on 10-point average roughness Rz according to JIS standard. More specifically, a sample in a square shape of 5 mm in length and 5 mm in width was cut out from an intermediate transfer member, from which a surface roughness curve was obtained by AFM (trade name: L-TRACE, made by SII Nano Technology Inc.). Subsequently, a reference length of 10 μm was extracted in the average line direction of the roughness curve. The summation of the average of the absolute values of the peak elevations of the highest to the fifth highest peaks measured from the average line in the extracted portion in the depth magnification direction and the average of the absolute values of the valley bottom elevations of the lowest to the fifth lowest valley bottoms was obtained.

(5. Evaluation of Endurance)

Instead of the intermediate transfer belt of polyimide mounted on a full-color electrophotographic image forming apparatus (trade name: IMAGE RUNNER ADVANCE C5051; made by Canon Inc.), an intermediate transfer belt in each of the Examples or Comparative Examples was mounted. The endurance of the intermediate transfer belt in each of the Examples or Comparative Examples was evaluated by using the electrophotographic image forming apparatus.

More specifically, 30,000 sheets of a black electrophotographic image with a density of 2% were continuously outputted. The image was formed on a plain paper with A4 size (trade name: CS 814, made by Canon Inc.). The images were outputted under the environment at a temperature of 25° C. with a relative humidity of 55%. Immediately after completion of outputting 30,000 sheets of the image, the intermediate transfer belt to be evaluated was removed from the electrophotographic image forming apparatus, and the contact angle of the surface of the intermediate transfer belt for n-hexadecane was measured.

Furthermore, since immediately after completion of outputting 30,000 sheets of the image, the contact angle of the surface of the intermediate transfer belt for n-hexadecane was measured for every 10 minutes, so that the time required for recovering to the (initial) contact angle of the surface of the intermediate transfer belt to be evaluated for n-hexadecane before the endurance test was measured.

When no recovery of the contact angle of the surface for n-hexadecane back to the initial contact angle was made at an elapsed time of one hour immediately after completion of outputting 30,000 sheets of the image, the contact angle of the surface for n-hexadecane was then measured for every one hour until an elapsed time of 24 hours immediately after completion of outputting 30,000 sheets of the image.

The results were evaluated by the following criteria. The evaluation results of endurance are described in Table 3 together with the contact angle before the endurance test.

Rank "A": The contact angle before the endurance test was recovered within 24 hours after the endurance test.

In the rank A, when the contact angle before the endurance test was recovered within one hour after the endurance test, the evaluation was ranked "AA" in Table 3.

Rank "C": The contact angle was not recovered to the initial contact angle at an elapsed time of 24 hours after the endurance test.

Rank "F": Due to poor curing, the surface hardness did not achieve the minimum endurance for the surface layer of a electrophotographic member.

(6. Evaluation of Bleeding)

The amount of silicon atoms in the silicone compound at the surface of the surface layer of the intermediate transfer belt was chronologically measured by X-ray photoelectron spectroscopy (ESCA). Through the observation of the change (increase) in the amount of silicon atoms at the surface, the presence or absence of occurrence of bleeding was determined. Observation was performed at the timing immediately after forming the surface layer, after 24 hours and after 1 week, under the same conditions for measuring the atom % of silicon. The "presence of occurrence of bleeding" was determined for an increase of 5 atom % or more. The evaluation criteria described in Table 3 are as follows.

A: Absence of occurrence of bleeding.

C: Presence of occurrence of bleeding.

Example 1

An intermediate transfer belt of polyimide resin in an endless shape for a full-color electrophotographic image forming apparatus (trade name: IMAGE RUNNER ADVANCE C5051, made by Canon Inc.) was prepared as substrate.

Dipentaerythritol hexaacrylate (6-functional acrylate, trade name: KAYARAD DPHA, made by Nippon Kayaku Co., Ltd.) in an amount of 95 mass % and a heterogeneous functional group, i.e. polyether-hydroxyl group, modified silicone (weight average molecular weight Mw=12,000, trade name: X-22-6266, made by Shin-Etsu Silicone) in an amount of 5 mass % were mixed, and diluted with methyl isobutyl ketone so as to have a resin solid content concentration of 20%. Furthermore, relative to 100 mass % of the total resin components, 25 mass % of gallium-doped zinc oxide (made by CIK Nano Tek) as conductive metal oxide and 3 mass % of a photopolymerization initiator (trade name: IRGACURE 184, made by Ciba-Geigy K.K.) were mixed to produce a dispersion liquid of these. The surface of the intermediate transfer belt was coated with the dispersion liquid by slit coating, so that a coating film was formed, which was dried at 60° C. for 2 minutes. Subsequently the coating film was cured with UV exposure so as to form a surface layer. An "intermediate transfer belt 1" of the Example was thus produced. Using a UV exposure apparatus (trade name: UE 06/81-3, made by Eye Graphics) as UV ray source, UV exposure was performed until the integral amount of light reached 1,200 mJ/cm$^2$. The thus produced intermediate transfer belt 1 was variously evaluated as described above. The substrate had a film thickness of 89 μm. Other evaluation results are described in Table 3.

Examples 2 to 11

In Example 1, any one of the type of binder resin raw material, the type of modified silicone compound, and the used amount of the modified silicone compound relative to 100 mass % of the total resin components, was changed to the condition described in Table 1, in preparation of the mixed dispersion liquid. Except for the change, each of the intermediate transfer belts 2 to 11 was produced in the same way as in Example 1 for each of the evaluations. The evaluation results are described in Table 3.

Examples 12 and 13

Except that a silicone grafted oligomer of which the type and the amount are described in Table 1 was further added in preparation of the mixed dispersion liquid in Example 1, each of the intermediate transfer belts 12 and 13 was produced in the same way as in Example 1 for each of the evaluations. The evaluation results are described in Table 3. The amount of the silicon grafted oligomer in Table 1 is the used amount relative to 100 mass % of the total resin components.

Comparative Examples 1 to 4

Except that a type of compound described in Table 2 was used as the modified silicone compound in preparation of the mixed dispersion liquid in Example 1, each of the intermediate transfer belts 14 to 17 was produced in the same way as in Example 1 for each of the evaluations. The evaluation results are described in Table 3.

The result of the discharge endurance test of the intermediate transfer belt 14 of Comparative Example 1 was ranked as "C". The reason is assumed that since the intermediate transfer belt 14 allowed for easy bleeding of the modified silicone compound, almost all of the modified silicone compounds contained in the intermediate transfer belt 14 were consumed in a short time during the test for outputting 30,000 sheets of the image, so that insufficient amount of the modified silicone compounds remained for recovering the contact angle of the surface after 30,000 sheets of image output.

In Comparative Examples 2 and 4, addition of a modified silicone compound having low compatibility with an acrylic resin caused poor curing, resulting in no achievement of surface hardness durable for electrophotographic processes even with an increased UV output and a prolonged curing time. Accordingly, the measurement of surface roughness and the evaluation of discharge endurance were not performed.

Comparative Examples 5 and 6

Except that the binder resin raw material for use was changed to the material described in Table 2 in preparation of the mixed dispersion liquid and curing conditions were changed to "leaving alone at room temperature for 24 hours" in Example 1, each of the intermediate transfer belts 18 and 19 was produced in the same way as in Example 1 for each of the evaluations. The evaluation results are described in Table 3.

TABLE 1

| | | Modified silicone compound having polyether group and hydroxyl group | | Silicone grafted oligomer | |
|---|---|---|---|---|---|
| | Binder resin | Type | Used amount (mass %) | Type | Used amount (mass %) |
| Example 1 | KAYARAD DPHA made by Nippon Kayaku (Dipentaerythritol hexaacrylate) | X-22-6266 made by Shin-Etsu silicone (Mw = 12,000) | 5 | — | — |
| Example 2 | Same as above | Same as above | 10 | — | — |
| Example 3 | Same as above | Same as above | 20 | — | — |
| Example 4 | Same as above | Same as above | 40 | — | — |
| Example 5 | Same as above | Same as above | 60 | — | — |
| Example 6 | Same as above | X-22-4272 made by Shin-Etsu silicone (Mw = about 6,000) | 5 | — | — |
| Example 7 | Same as above | X-22-4952 made by Shin-Etsu silicone (Mw = about 10,000) | 5 | — | — |
| Example 8 | Same as above | SH3773M made by Dow Toray (Mw = 15,000) | 5 | — | — |
| Example 9 | PETIA made by Daicel-Cytec (Pentaerythritol triacrylate) | X-22-6266 made by Shin-Etsu silicone (Mw = about 12,000) | 5 | — | — |
| Example 10 | M-408DTMPTA made by Toagosei (Ditrimethylol propane tetraacrylate) | Same as above | 5 | — | — |
| Example 11 | M-402DPPA made by Toagosei (Dipentaerythritol pentaacrylate) | Same as above | 5 | — | — |
| Example 12 | KAYARAD DPHA made by Nippon Kayaku (Dipentaerythritol hexaacrylate) | Same as above | 5 | ZX-212 made by T&K TOKA (Double bond equivalent: 590 g/eq) | 5 |
| Example 13 | Same as above | Same as above | 5 | ZX-201 made by T&K TOKA (Double bond equivalent: 1,140 g/eq) | 5 |

TABLE 2

| | Binder resin | Modified silicone compound |
|---|---|---|
| Comparative Example 1 | KAYARAD DPHA made by Nippon Kayaku (Dipentaerythritol hexaacrylate) | KF-353 made by Shin-Etsu silicone (Polyether modified silicone, Mw = about 12,000) |
| Comparative Example 2 | Same as above | KF-9701 made by Shin-Etsu silicone (Hydroxyl group modified silicone, Mw = about 5,000) |
| Comparative Example 3 | Same as above | X-22-1602 made by Shin-Etsu silicone (Polyether-acryl hetero-modified silicone, Mw = about 12,000) |
| Comparative Example 4 | Same as above | KF-96-350CS made by Shin-Etsu silicone (Dimethyl silicone, Mw = about 12,000) |
| Comparative Example 5 | DM653 made by DIC (Two liquid type urethane coating liquid including isocyanate) | X-22-6266 made by Shin-Etsu silicone (Mw = 12,000) |
| Comparative Example 6 | 16-416 made by DIC (Two liquid type urethane coating liquid including isocyanate) | Same as above |

TABLE 3

| | Electrophotographic member | Film thickness of surface layer (μm) | Contact angle before endurance test (°) | Surface hardness (GPa) | Surface roughness (μm) | Discharge endurance | Bleeding |
|---|---|---|---|---|---|---|---|
| Example 1 | Intermediate transfer belt 1 | 1.8 | 33.0 | 0.28 | 0.31 | A | A |
| Example 2 | Intermediate transfer belt 2 | 2.1 | 33.6 | 0.27 | 0.33 | A | A |
| Example 3 | Intermediate transfer belt 3 | 2.2 | 33.6 | 0.29 | 0.29 | AA | A |
| Example 4 | Intermediate transfer belt 4 | 1.6 | 33.2 | 0.25 | 0.31 | AA | A |
| Example 5 | Intermediate transfer belt 5 | 2.4 | 32.5 | 0.24 | 0.30 | AA | A |
| Example 6 | Intermediate transfer belt 6 | 2.0 | 31.1 | 0.26 | 0.36 | AA | A |
| Example 7 | Intermediate transfer belt 7 | 2.2 | 33.3 | 0.27 | 0.35 | AA | A |
| Example 8 | Intermediate transfer belt 8 | 2.4 | 34.5 | 0.26 | 0.34 | A | A |
| Example 9 | Intermediate transfer belt 9 | 2.1 | 33.1 | 0.18 | 0.31 | AA | A |
| Example 10 | Intermediate transfer belt 10 | 1.9 | 33.9 | 0.22 | 0.37 | AA | A |
| Example 11 | Intermediate transfer belt 11 | 1.9 | 32.9 | 0.25 | 0.37 | A | A |
| Example 12 | Intermediate transfer belt 12 | 2.3 | 34.4 | 0.28 | 0.17 | AA | A |
| Example 13 | Intermediate transfer belt 13 | 2.3 | 34.5 | 0.29 | 0.14 | AA | A |
| Comparative Example 1 | Intermediate transfer belt 14 | 2.1 | 32.3 | 0.27 | 0.41 | C | C |
| Comparative Example 2 | Intermediate transfer belt 15 | 1.8 | 33.3 | F | — | F | — |
| Comparative Example 3 | Intermediate transfer belt 16 | 2.1 | 32.7 | 0.29 | 0.43 | C | A |
| Comparative Example 4 | Intermediate transfer belt 17 | 2.1 | 32.3 | F | — | F | — |
| Comparative Example 5 | Intermediate transfer belt 18 | 3.1 | 31.2 | 0.2 | 0.41 | C | A |
| Comparative Example 6 | Intermediate transfer belt 19 | 3.3 | 30.0 | 0.22 | 0.38 | C | A |

The electrophotographic member of the present invention can be suitably used as the intermediate transfer member of a full-color electrophotographic image forming apparatus such as an electrophotographic type copier and printer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-124190, filed Jun. 12, 2013, which is hereby incorporated by reference herein in its entirety.

What is claimed is:

1. An electrophotographic member comprising:

a substrate; and a surface layer comprising a binder resin having an acrylic skeleton, and a modified silicone compound having a polyether group and a hydroxyl group in a molecule, wherein the surface layer has a surface having a n-hexadecane contact angle of 30° or more, and the surface layer has an average hardness in the range of 0.20-0.30 GPa in a depth region of 10% to 20% of the thickness from the outermost surface by nano-indentation method with a Berkovich indenter.

2. The electrophotographic member according to claim 1, wherein the binder resin includes a structural unit represented by chemical formula (1)

(1)

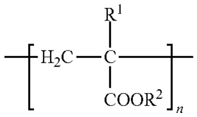

where $R^1$ represents a hydrogen atom or a methyl group, $R^2$ represents a hydrogen atom or an alkyl, and "n" represents an integer of 2 or more;

the modified silicone compound includes a structure represented by chemical formula (2):

(2)

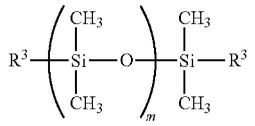

where "m" represents an integer of 2 or more, and $R^3$ has a structure represented by chemical formula (3):

$$-(C_pH_{(2p)}O)_a-(C_qH_{(2q)}O)_b-H \quad (3)$$

where "p" and "q" independently represent an integer of 2 or more, and "a" and "b" each represent an integer of 1 or more.

3. The electrophotographic member according to claim 1, wherein the modified silicone compound has a weight average molecular weight (Mw) of 6,000 to 12,000.

4. The electrophotographic member according to claim 1, wherein the modified silicone compound has a hydroxyl value (mg KOH/g) of 30 to 70.

5. The electrophotographic member according to claim 1, wherein the modified silicone compound is contained in the surface layer in an amount of 5 to 60 mass % relative to the resin components in the surface layer.

6. An intermediate transfer member for use in an electrophotographic image forming apparatus that obtains an image by primary-transferring a toner image formed on a first image bearing member to an intermediate transfer member and then secondary-transferring the primary-transferred toner image on the intermediate transfer member onto a second image bearing member, wherein the intermediate transfer member is the electrophotographic member according to claim 1.

7. An electrophotographic image forming apparatus that obtains an image by primary-transferring a toner image formed on a first image bearing member to an intermediate transfer member and then secondary-transferring the primary-transferred toner image on the intermediate transfer member onto a second image bearing member, wherein the intermediate transfer member is the electrophotographic member according to claim 1.

* * * * *